(12) United States Patent
Shishido

(10) Patent No.: US 12,284,328 B2
(45) Date of Patent: Apr. 22, 2025

(54) DISPLAY APPARATUS, DISPLAY SYSTEM, AND DISPLAY ADJUSTMENT METHOD

(71) Applicant: JVCKENWOOD Corporation, Yokohama (JP)

(72) Inventor: Tomoyuki Shishido, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 509 days.

(21) Appl. No.: 17/685,431

(22) Filed: Mar. 3, 2022

(65) Prior Publication Data

US 2022/0321868 A1    Oct. 6, 2022

Related U.S. Application Data

(63) Continuation of application No. PCT/JP2020/035635, filed on Sep. 18, 2020.

(30) Foreign Application Priority Data

Sep. 25, 2019   (JP) .................................. 2019-173812
Sep. 25, 2019   (JP) .................................. 2019-174631

(51) Int. Cl.
*H04N 13/38*      (2018.01)
*G02B 27/01*      (2006.01)
(Continued)

(52) U.S. Cl.
CPC ....... *H04N 13/383* (2018.05); *G02B 27/0172* (2013.01); *G02B 27/0179* (2013.01); *G06F 3/013* (2013.01); *G02B 2027/0187* (2013.01)

(58) Field of Classification Search
CPC ...... G02B 27/00; G02B 27/01; G02B 27/017; G02B 27/0101; G02B 27/0172;
(Continued)

(56) References Cited

U.S. PATENT DOCUMENTS 5,825,456 A    10/1998   Tabata et al.
6,545,650 B1   4/2003    Yamada et al.
(Continued)

FOREIGN PATENT DOCUMENTS

JP      06-315121      11/1994
JP      09-243956      9/1997
(Continued)

OTHER PUBLICATIONS

International Search Report and Written Opinion for International Application No. PCT/JP2020/035635 mailed on Dec. 15, 2020, 11 pages.

*Primary Examiner* — Sultan Chowdhury
(74) *Attorney, Agent, or Firm* — Amin, Turocy & Watson, LLP

(57) ABSTRACT

A display apparatus includes: a left-eye display unit and a right-eye display unit arranged side by side in a left-right direction to display an image; a line-of-sight detection unit configured to detect a left line of sight for an image and a right line of sight for an image when the user gazes at a target image displayed on the left-eye and the right-eye display units provided in front of the user, and an adjustment unit configured to adjust, based on the left and the right lines of sight for the image, a display position at which an image is displayed on each of the left-eye and the right-eye display units, wherein the adjustment unit is further configured to adjust the display position in accordance with a first difference in an up-down direction between the left and the right lines of sight for the image.

11 Claims, 11 Drawing Sheets

(51) Int. Cl.
*G06F 3/01* (2006.01)
*H04N 13/383* (2018.01)

(58) Field of Classification Search
CPC ............ G02B 27/0179; G02B 27/0093; H04N 13/344; H04N 13/383; H04N 13/385; H04N 13/398; G06F 3/00; G06F 3/011; G06F 3/012; G06F 3/013; G06F 3/0234; G09G 5/16; G09G 5/36; G09G 5/38
See application file for complete search history.

(56) References Cited

U.S. PATENT DOCUMENTS

| | | |
|---|---|---|
| 2015/0002394 A1 | 1/2015 | Cho et al. |
| 2015/0177518 A1 | 6/2015 | Wong et al. |
| 2017/0344112 A1 | 11/2017 | Wilson et al. |
| 2019/0302883 A1* | 10/2019 | Greer .................... G06T 1/20 |
| 2019/0391402 A1* | 12/2019 | Shimizu ................ G06F 3/013 |
| 2021/0080727 A1* | 3/2021 | Yamada ................ G02B 30/22 |

FOREIGN PATENT DOCUMENTS

| | | |
|---|---|---|
| JP | 11-202256 | 7/1999 |
| JP | 2000-013818 | 1/2000 |
| JP | 2001-211403 | 8/2001 |
| JP | 2002-123248 | 4/2002 |
| JP | 2017-215928 | 12/2017 |
| JP | 2019-159076 | 9/2019 |
| WO | 2010/098363 | 9/2010 |

* cited by examiner

DISPLAY APPARATUS, DISPLAY SYSTEM, AND DISPLAY ADJUSTMENT METHOD

CROSS-REFERENCE TO RELATED APPLICATIONS

This application is a Continuation of PCT International Application No. PCT/JP2020/035635 filed on Sep. 18, 2020 which claims the benefit of priority from Japanese Patent Applications No. 2019-173812 and No. 2019-174631, both filed on Sep. 25, 2019, the entire contents of all of which are incorporated herein by reference.

FIELD

The present application relates to a display apparatus, a display system, and a display adjustment method.

BACKGROUND

A display apparatus, such as a head mounted display (HMD), worn on a head of a user is known as a technology of realizing virtual reality (VR) or augmented reality (AR) (for example, see Japanese Laid-open Patent Publication No. 2001-211403). This type of a display apparatus is configured such that, for example, a display for each of the left eye and the right eye of the user is arranged, and a video image displayed on a left-eye display is viewed by a left eye of the user and a video image displayed on a right-eye display is viewed by a right eye of the user. Furthermore, with the display apparatus, when the user gazes at an object that is present in a real space, an image in a virtual space that is set in advance is displayed on each of the left-eye display and the right-eye display in a superimposed manner on the object in the real space, and an adjustment therefor is able to be performed such that the object in the real space and the image in the virtual space appropriately overlap with one another.

With the display apparatus described above, there may be a case in which a line of sight in a case in which the user gazes at an object in a real space and a line of sight in a case in which the user gazes at an image in a virtual space deviate in an up-down direction. In this case, if the user attempts to gaze at the object in the real space, the image in the virtual space is not formed. In contrast, if the user attempts to gaze at the image in the virtual space, the object in the real space is not formed. Accordingly, a burden is imposed on the eyes of the user. Furthermore, with the display apparatus described above, a line of sight at the time of viewing the left-eye display by the left eye and a line of sight at the time of viewing the right-eye display by the right eye sometimes deviate in the up-down direction. In this case, the image is not formed at the moment when the user views the target image, but is formed by moving the left and right eyeballs of the user in the up-down direction according to a command from the brain. However, in this case, a burden is imposed on the eyes of the user.

SUMMARY

A display apparatus, a display system, and a display adjustment method are disclosed.

According to one aspect, there is provided a display apparatus comprising: a left-eye display unit and a right-eye display unit that are arranged side by side in a left-right direction and configured to display an image; a line-of-sight detection unit configured to detect a line of sight for an image comprising a left line of sight for an image of a left eyeball of a user and a right line of sight for an image of a right eyeball of the user in a state in which the user gazes at a target image displayed on each of the left-eye display unit and the right-eye display unit provided in front of the user in a front-back direction thereof; and an adjustment unit configured to adjust, based on the left line of sight for the image and the right line of sight for the image, a display position at which an image is displayed on each of the left-eye display unit and the right-eye display unit, wherein the adjustment unit is further configured to adjust the display position in accordance with a first difference in an up-down direction between the left line of sight for the image and the right line of sight for the image.

According to one aspect, there is provided a display system comprising: a display apparatus that includes a left-eye display unit and a right-eye display unit that are arranged side by side in a left-right direction and configured to display an image, a line-of-sight detection unit configured to detect a left line of sight for an image of a left eyeball of a user and a right line of sight for an image of a right eyeball of the user in a state in which the user gazes at a target image displayed on each of the left-eye display unit and the right-eye display unit provided in front of the user in a front-back direction thereof; and an output unit configured to output the left line of sight for the image and the right line of sight for the image; and an external processing device configured to generate, based on an output result received from the output unit, image data in which a display position of an image to be displayed on each of the left-eye display unit and the right-eye display unit has been adjusted and to input the generated image data to the display apparatus, wherein the external processing device is further configured to adjust the display position in accordance with the first difference in the up-down direction between the left line of sight for the image and the right line of sight for the image.

According to one aspect, there is provided a display adjustment method comprising: displaying a target image on each of a left-eye display unit and a right-eye display unit that are arranged side by side in a left-right direction in front of a user in the front-back direction thereof to display an image; detecting a left line of sight for an image of a left eyeball of a user and a right line of sight for an image of a right eyeball of the user in a state in which the user gazes at the target image displayed on each of the left-eye display unit and the right-eye display unit; and adjusting a display position at which an image is displayed on each of the left-eye display unit and the right-eye display unit based on the left line of sight for the image and the right line of sight for the image, wherein the display position is adjusted in accordance with a first difference in an up-down direction between the left line of sight for the image and the right line of sight for the image.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Preferred embodiments of a display apparatus, a display system, and a display adjustment method according to the present application will be explained with reference to the accompanying drawings. Furthermore, the present application is not limited to the embodiments described below. Furthermore, the components described in the embodiment include one that can easily be replaced by those skilled in the art or one that is substantially identical.

Display Apparatus

Figure 1:
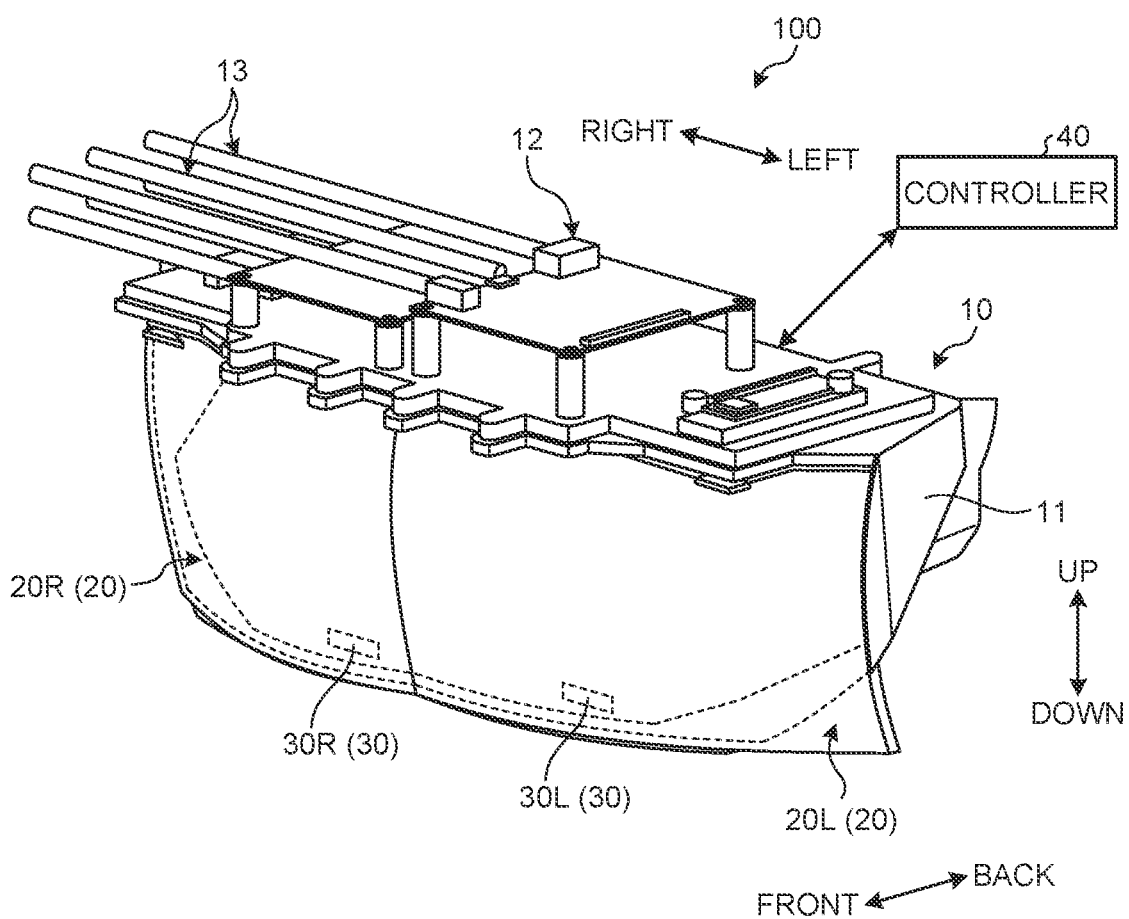
FIG. 1 is a diagram schematically illustrating an example of a display apparatus according to a present embodiment.

FIG. 1 is a diagram schematically illustrating an example of a display apparatus 100 according to the present embodiment. As illustrated in FIG. 1, the display apparatus 100 is a head mounted display that is wearable for, for example, a user worn on a head.

In a description below, each of a left-right direction, a front-back direction, and an up-down direction is defined as a direction in a state in which a user wears the display apparatus 100 on the head. The left-right direction is a direction for the left and right eyeballs of the user, and the left eye side is defined to be a leftward direction, whereas the right eye side is defined to be a rightward direction. Regarding the front-back direction, a face side of the head of the user is defined to be a forward direction, whereas a back side of the head of the user is defined to be a backward direction. Regarding the up-down direction, a top side of the head of the user is defined to be an up direction, whereas a bottom side of the head of the user is defined to be a down direction.

The display apparatus 100 includes, as illustrated in FIG. 1, a main body unit 10, a display unit 20, a line-of-sight detection unit 30, and a controller 40. The main body unit 10 includes a housing 11, a connector 12, and a power supply unit 13. The housing 11 accommodates an optical system OS that will be described later. The housing 11 is provided with the display unit 20 that will be described later. The power supply unit 13 supplies electric power to the main body unit 10 via the connector 12, transmits and receives an electrical signal, and the like.

The display unit 20 includes a left-eye display unit 20L and a right-eye display unit 20R. The left-eye display unit 20L and the right-eye display unit 20R are arranged side by side in the left-right direction so as to be associated with the respective left and right eyeballs of the user.

Figure 2:
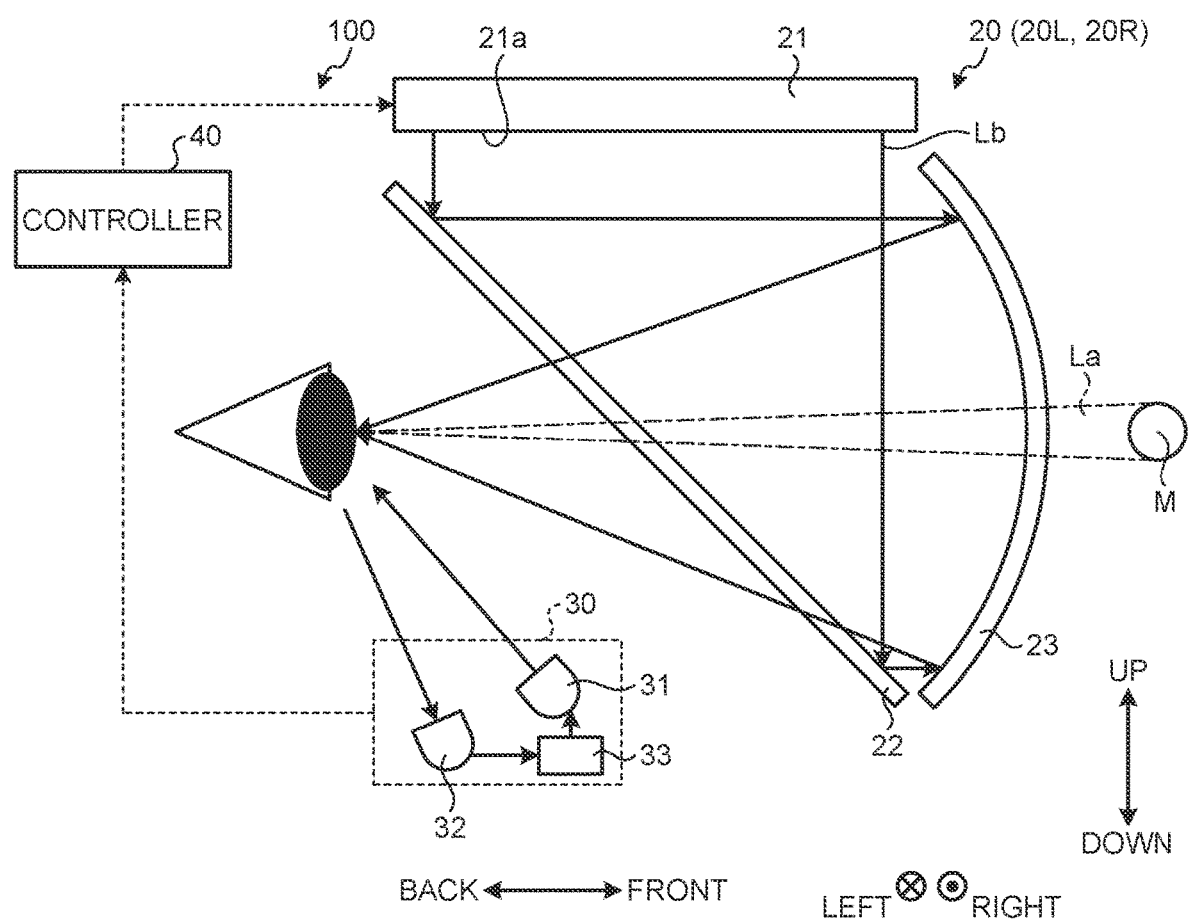
FIG. 2 is a diagram schematically illustrating an example of a display unit in the display apparatus.

FIG. 2 is a diagram schematically illustrating a configuration of the display unit 20 in the display apparatus 100. As illustrated in FIG. 2, the display unit 20 includes a display panel 21, a half mirror 22, a combiner mirror 23, and the line-of-sight detection unit 30. For the display panel 21, various display panels, such as a liquid crystal panel, an organic EL panel, or a plasma panel may be used. The display unit 20 is arranged in front of each of the left and right eyeballs of the user in a state in which the user wears the display apparatus 100. The display panel 21 includes a display surface 21a on which an image in a virtual space is displayed.

The half mirror 22 reflects, for example, a portion of light and transmits another portion of light. The half mirror 22 reflects, toward the combiner mirror 23, a portion of display light Lb irradiated from the display panel 21. Furthermore, the half mirror 22 transmits a portion of light reflected by the combiner mirror 23.

The combiner mirror 23 transmits real image light La constituting an image of an object M that is present in a real space to the half mirror 22 side. The real image light La passes through the combiner mirror 23 and the half mirror 22 and is able to reach the left and right eyeballs of the user. As a result, the user is able to gaze at the object M passing through the left-eye display unit 20L and the right-eye display unit 20R. Furthermore, the combiner mirror 23 reflects, toward the half mirror 22, the display light Lb that has been reflected by the half mirror 22. The half mirror 22 and the combiner mirror 23 constitute an optical system OS that guides the real image light La and the display light Lb. In the present embodiment, the optical system OS that guides the real image light La and the display light Lb to the eyeballs of the user (a right eye ER and a left eye EL: see FIG. 3 and FIG. 4) in a state in which the user wears the display apparatus 100.

The line-of-sight detection unit 30 detects a line of sight obtained from each of the left and right eyeballs of the user. It is possible to use, as the line-of-sight detection unit 30, various devices that is able to detect a line of sight of the user, such as a line-of-sight detection device capable of detecting a line of sight based on, for example, a position of a pupil of the user and a position of a corneal reflection image or a line-of-sight detection device capable of detecting a line of sight based on a position of the inner corner of the eye and a position of the iris of the user.

Figure 5:
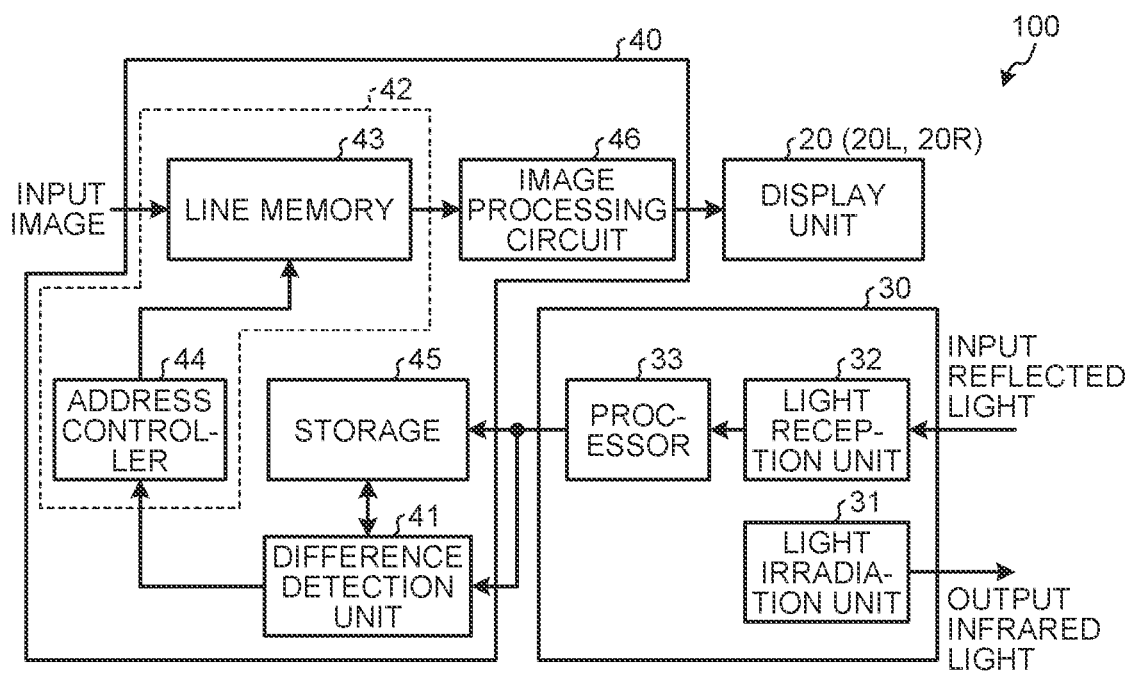
FIG. 5 is a functional block diagram illustrating an example of the display apparatus.

The line-of-sight detection unit 30 includes a light irradiation unit 31, a light reception unit 32, and a processor 33 (see FIG. 2 and FIG. 5). The light irradiation unit 31 irradiates the left and right eyeballs of the user with infrared light. The light reception unit 32 receives the infrared light reflected at the left and right eyeballs of the user, and generates images of the left and right eyeballs of the user. The processor 33 detects, based on the generated image, a line of sight of the user as a line-of-sight vector defined by a three-dimensional global coordinate system.

Figure 3:
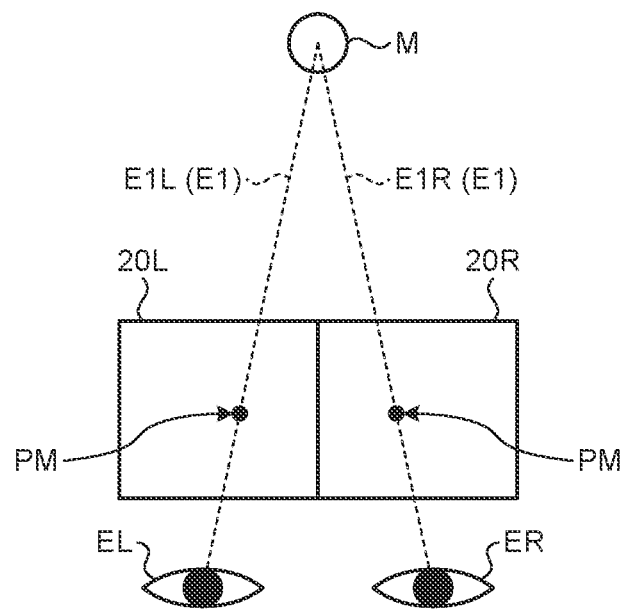
FIG. 3 is a diagram schematically illustrating an example of a line of sight for an object.
Figure 4:
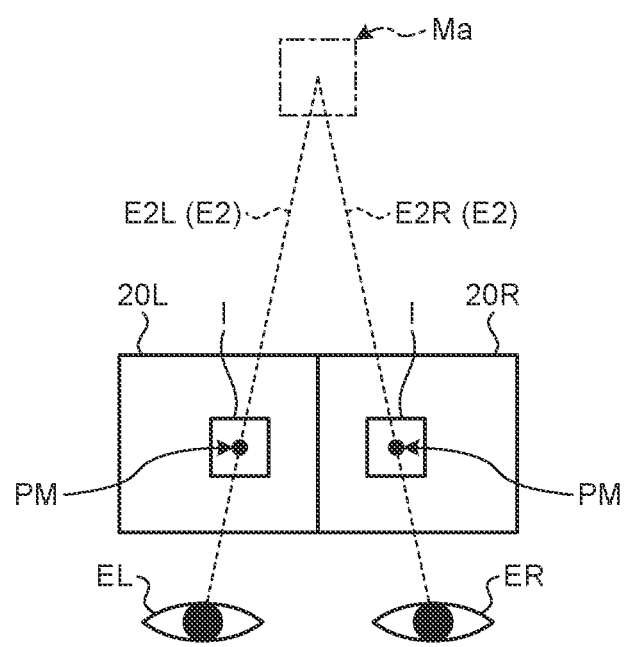
FIG. 4 is a diagram schematically illustrating an example of a line of sight for an image.

The processor 33 is able to detect a line of sight for an object and a line of sight for an image of each of the left and right eyeballs of the user. The processor 33 transmits the detected line of sight for the object and the detected line of sight for the image to a storage 45 that will be described later. FIG. 3 is a diagram schematically illustrating an example of the line of sight for the object. As illustrated in FIG. 3, a line of sight E1 for the object includes a line of sight for the object of each of the left and right eyeballs (the left eye EL and the right eye ER) of the user in a case in which the user gazes at the object M passing through the left-eye display unit 20L and the right-eye display unit 20R. Furthermore, when the line of sight E1 for the object of each of the left and right eyeballs is distinguished, the line of sight E1 for the object of the left eye EL is referred to as a left line of sight E1L for the object, and the line of sight E1 for the object of the right eye ER is referred to as a right line of sight E1R for the object. FIG. 4 is a diagram schematically illustrating an example of the line of sight for an image. As illustrated in FIG. 4, a line of sight E2 for the image includes a line of sight for the image of each of the left and right eyeballs (the left eye EL and the right eye ER) of the user in a case in which the user gazes at a target image I in a state in which the target image I is displayed at a position PM associated with the object M on the left-eye display unit 20L and the right-eye display unit 20R. Furthermore, when the line of sight E2 for the image of each of the left and right eyeballs is distinguished, the line of sight E2 for the image of the left eye EL is referred to as a left line of sight E2L for the image, and the line of sight E2 for the image of the right eye ER is referred to as a right line of sight E2R for the image. If the user gazes at the target image I, the target image I of each of the left and right sides is formed so as to be present at a position Ma that is superimposed on the object M.

FIG. 5 is a functional block diagram illustrating an example of the display apparatus 100. As illustrated in FIG. 5, the controller 40 includes a difference detection unit 41, an adjustment unit 42, the storage 45, and an image processing circuit 46. The controller 40 is an arithmetic processing device constituted by, for example, a central processing unit (CPU), or the like. The controller 40 loads a program stored in a memory and executes a command included in the program. An example of the controller 40 includes an internal memory that is not illustrated, or the like. The internal memory stores therein a program for implementing each of the units included in the controller 40. In this case, the controller 40 implements a function of each of the units by loading and executing the program stored in an internal memory or the like. Furthermore, the internal memory is also used to temporarily store therein data in the controller 40.

The difference detection unit 41 obtains a difference between the detection results based on the detection result obtained by the line-of-sight detection unit 30. The difference detection unit 41 is able to obtain a difference by using information stored in the storage 45. The storage 45 stores information on the line of sight E1 for the object and the line of sight E2 for the image detected by the line-of-sight detection unit 30. Furthermore, the storage 45 stores therein a display adjustment program that causes a computer to execute a process of detecting the line of sight E1 for the object of each of the left and right eyeballs of the user in a case in which the user gazes at the object M in front of the user in the front-back direction passing through the left-eye display unit 20L and the right-eye display unit 20R that are arranged side by side in the left-right direction, that are able to transmit a portion of light, and that are able to display an image, and a process of detecting the line of sight E2 for the image of each of the left and right eyeballs of the user in a case in which the user gazes at the target image I in a state in which the target image I is displayed at a position associated with the object M in the left-eye display unit 20L and the right-eye display unit 20R; and a process of adjusting a display position of the image in a case in which the image is displayed on the left-eye display unit 20L and the right-eye display unit 20R in accordance with a difference between the line of sight E1 for the object and the line of sight E2 for the image in the up-down direction that is orthogonal to each of the left-right direction and the front-back direction.

The difference detection unit 41 obtains a difference between the line of sight E1 for the object and the line of sight E2 for the image based on the line of sight E1 for the object and the line of sight E2 for the image that are detected by the line-of-sight detection unit 30. In this case, the difference detection unit 41 obtains the difference between the line of sight E1 for the object and the line of sight E2 for the image in the up-down direction that is orthogonal to each of the left-right direction and the front-back direction. The difference may be regarded as a length of a vector in the up-down direction obtained as, for example, a difference between line-of-sight vectors. Furthermore, the difference detection unit 41 individually obtains a difference between the line of sight E1 for the object and the line of sight E2 for the image of the right and left eyes, respectively. In other words, the difference detection unit obtains a difference between the left line of sight E1L for the object and the left line of sight E2L for the image for the left eye, and obtains a difference between the right line of sight E1R for the object and the right line of sight E2R for the image for the right eye.

When the difference detection unit 41 obtains the difference between the line of sight E1 for the object and the line of sight E2 for the image, the difference detection unit 41 may obtain a difference between positions of the gaze points of the user. In this case, the difference detection unit 41 defines an intersection point between the line of sight E1 for the object and a predetermined virtual plane that is set by the display unit 20 as an object gaze point P1 (see FIG. 7). Furthermore, the difference detection unit 41 defines an intersection point between the line of sight E2 for the image and a predetermined virtual plane that is set by the display unit 20 as an image gaze point P2 (see FIG. 7). An example of the virtual plane includes, for example, a plane that is perpendicular to the front-back direction and that is away from the left eye and the right eye of a subject by a predetermined distance. In this way, the object gaze point P1 is associated with the line of sight E1 for the object. Furthermore, the image gaze point P2 is associated with the line of sight E2 for the image. The difference detection unit 41 calculates a difference between the positions of the object gaze point P1 and the image gaze point P2 in the up-down direction. The difference calculated here may be regarded as a distance between, for example, the object gaze point P1 and the image gaze point P2 in the up-down direction.

Furthermore, if the left line of sight E2L for the image of the left eyeball of the user and the right line of sight E2R for the image of the right eyeball of the user are detected by the line-of-sight detection unit 30 in a case in which the user gazes at the target image I in a state in which the target image I is displayed at the position for the object M on the left-eye display unit 20L and the right-eye display unit 20R, the difference detection unit 41 obtains a difference between the left line of sight E2L for the image and the right line of sight E2R for the image in the up-down direction. The obtained difference is able to be regarded as a length of a vector in the up-down direction obtained as a difference between, for example, the line-of-sight vectors.

Furthermore, when the difference detection unit 41 obtains the difference between the left line of sight E2L for the image and the right line of sight E2R for the image, the difference detection unit 41 may obtain a difference between the positions of the gaze points of the user. In this case, the difference detection unit 41 defines an intersection point between the left line of sight E2L for the image and the display surface 21a as a left image gaze point PL (see FIG. 9). Furthermore, the difference detection unit 41 defines an intersection point between the right line of sight E2R for the image and the display surface 21a as a right image gaze point PR (see FIG. 9). In this way, the left image gaze point PL is associated with the left line of sight E2L for the image. Furthermore, the right image gaze point PR is associated with the right line of sight E2R for the image. The difference detection unit 41 calculates a difference between the positions of the left image gaze point PL and the right image gaze point PR in the up-down direction. The difference calculated here may be regarded as a distance between, for example, the left gaze point PL for the image and the right gaze point PR for the image in the up-down direction.

The adjustment unit 42 adjusts, in accordance with the difference detected by the difference detection unit 41, a display position of the image in a case in which the image is displayed on the left-eye display unit 20L and the right-eye display unit 20R. The adjustment unit 42 is able to adjust the display position in a stepwise manner in accordance with the difference in the up-down direction. For example, a magnitude of the detected difference is divided in accordance with a stepwise manner, and a division of an amount of adjustment is set in a stepwise manner so as to be associated with the division of the detected difference. As a result, an amount of adjustment is increased in a stepwise manner as the difference is increased. Furthermore, the adjustment unit 42 may be configured to detect only presence or absence of the difference and perform adjustment by a predetermined set amount when the difference is detected.

The adjustment unit 42 adjusts a display position of the image by correcting the image data that is input to, for example, the left-eye display unit 20L and the right-eye display unit 20R. The adjustment unit 42 is provided in each of the left-eye display unit 20L and the right-eye display unit 20R. The adjustment unit 42 includes a line memory 43 and an address controller 44. The line memory 43 stores each line image data displayed on the left-eye display unit 20L and the right-eye display unit 20R. The address controller 44 controls a reference address corresponding to a starting position of the image data that is to be read out and is output from the line memory 43.

Figure 6:
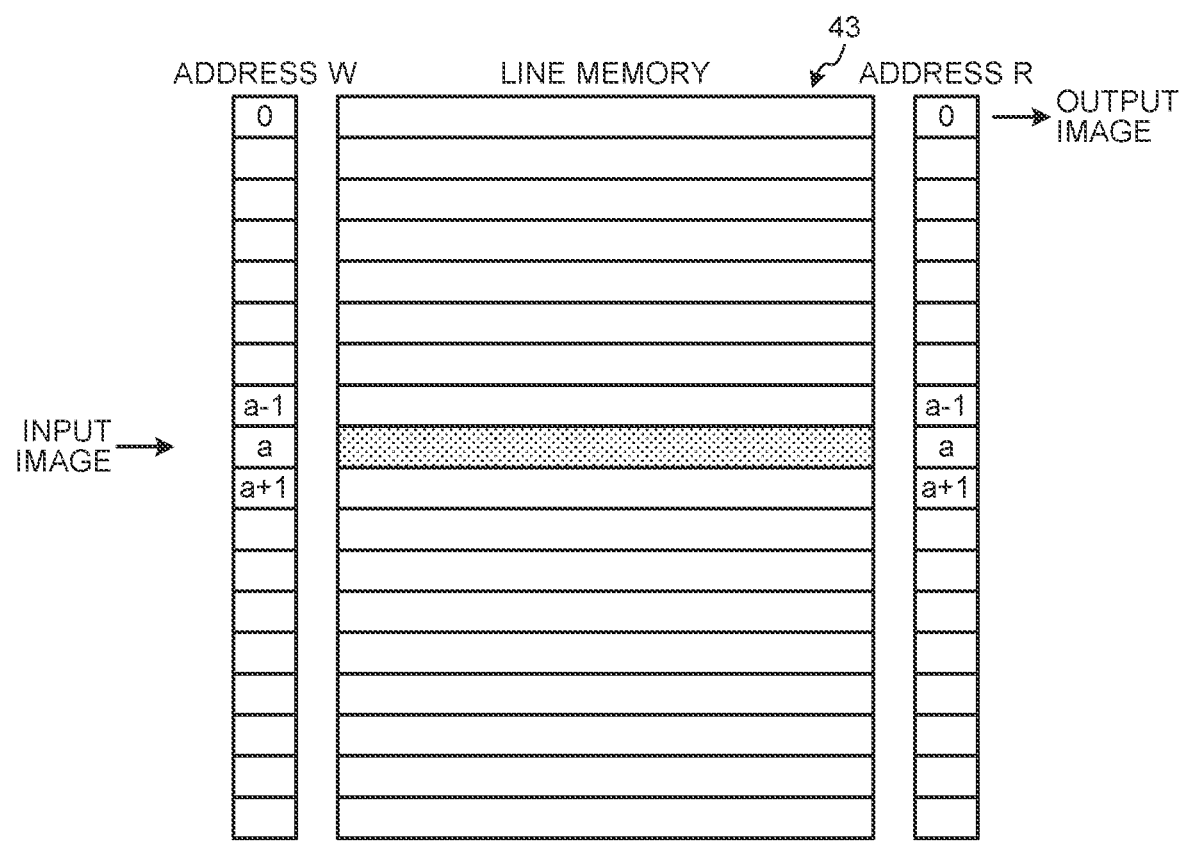
FIG. 6 is a diagram schematically illustrating an example of a line memory.

FIG. 6 is a diagram schematically illustrating an example of the line memory 43. As illustrated in FIG. 6, in the line memory 43, addresses for the respective lines are set. For example, the address on the uppermost line (first line) in FIG. 6 is set to 0, the subsequent addresses are sequentially set to 1, 2, . . . toward the bottom line, and the address on the last line is set to Z. In the line memory 43, the number of lines and the addresses are set so as to be associated with each of the left-eye display unit 20L and the right-eye display unit 20R.

In the line memory 43, a write address W and a read address R are set. The write address W indicates an address on the line to which the image data that is input from outside is written. The read address R indicates an address on the line from which the image data that is written to the line memory 43 is read. If the image data is input from outside, pieces of data are sequentially written starting from a line indicated by, for example, an address 0 to the line indicated by an address Z, and then, a process of writing the data to the lines returns to zero after the writing process reaches a maximum value Z.

A relationship between the write address W and the read address R will be described. If the reference address is denoted by a, the read address R with respect to the write address W can be represented by $$R = W - a \text{ (where, } R = Z - a \text{ in a case of } R < 0\text{)}$$

By setting the read address R in this way, if W=a holds, that is, if the pieces of image data have been written to the line that is associated with the reference address a among the lines included in the line memory 43, the read address R becomes 0. In this case, the image data that is written to the top line (the line corresponding to the address 0) in the line memory 43 is read out. In this way, the image data stored in the lines delayed for writing the image data by lines for the reference address a is output.

In contrast, if a value of the reference address a is set to be small by one line, a timing at which the top line is read is earlier by one line. Consequently, in appearance, a display image is displayed upwardly deviating by one line. Furthermore, if a value of the reference address a is increased by one line, the timing at which the top line is read is delayed by one line. As a result, in appearance, the display image is displayed downwardly deviating by one line. Therefore, by adjusting a value of the reference address a by the address controller 44, it is possible to move the position of the display image that is displayed on each of the left-eye display unit 20L and the right-eye display unit 20R in the up-down direction.

Display Adjustment Method

In the following, a display adjustment method according to the present embodiment will be described. In the display adjustment method according to the present embodiment, a display position is adjusted in a case in which an image is displayed on each of the left-eye display unit 20L and the right-eye display unit 20R in a state in which the user wears the display apparatus 100 described above on the head.

In the state in which the user wears the display apparatus 100 on the head, the left-eye display unit 20L is arranged in front of the left eye of the user, whereas the right-eye display unit 20R is arranged in front of the right eye of the user. In the display adjustment method according to the present embodiment, an adjustment is performed such that a difference between the line of sight E1 for the object in a case in which the user gazes at the object M located in front of the user through each of the left-eye display unit 20L and the right-eye display unit 20R and the line of sight E2 for the image of each of the left and right eyeballs of the user in a case in which the user gazes at the target image I in a state in which the target image I is displayed at a position associated with the object M on each of the left-eye display unit 20L and the right-eye display unit 20R is reduced.

First, a detection of a line of sight of each of the left eye and the right eye of the user is started by the line-of-sight detection unit 30. If the user is allowed to gaze at the object M in this state, it is preferable that the display unit 20 does not display an image on, for example, each of the left-eye display unit 20L and the right-eye display unit 20R. Furthermore, the display unit 20 may display information or the like for urging the user to gaze at the object M. The line-of-sight detection unit 30 detects the line of sight E1 for the object of the user in a state in which the user is allowed to gaze at the object M.

Subsequently, the line-of-sight detection unit 30 allows the user to gaze at the target image I. In this case, the display unit 20 displays the target image I at a position associated with the object M on each of the left-eye display unit 20L and the right-eye display unit 20R (for example, at a position superimposed on the object M). The display unit 20 may also display, similarly to the description above, information or the like for urging the user to gaze at the target image I. The line-of-sight detection unit 30 detects the line of sight E2 for the image of the user in a state in which the user is allowed to gaze at the target image I.

Figure 7:
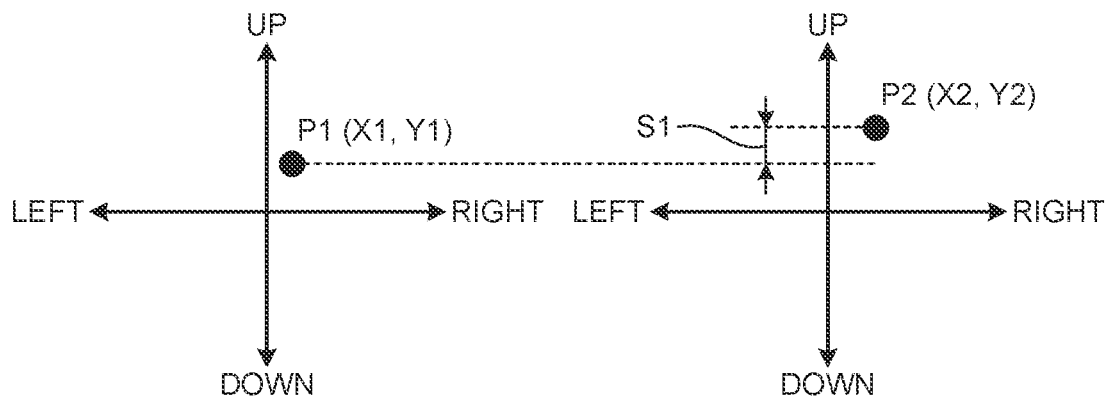
FIG. 7 is a diagram schematically illustrating an example of detection results of the line of sight for the object and the line of sight for the image.

FIG. 7 is a diagram schematically illustrating an example of a detection result of each of the line of sight E1 for the object and the line of sight E2 for the image. In the example illustrated in FIG. 7, the line-of-sight detection unit 30 is able to detect a position (X1, Y1) of the object gaze point P1 of the user associated with the line of sight E1 for the object and a position (X2, Y2) of the image gaze point P2 of the user associated with the line of sight E2 for the image as the line of sight E1 for the object and the line of sight E2 for the image, respectively.

In the present embodiment, the object gaze point P1 is an intersection point between the line-of-sight vector of the line of sight E1 for the object and the plane that is perpendicular to the front-back direction and that is away from the left eye and the right eye of the subject by a predetermined distance. Furthermore, the image gaze point P2 is an intersection point between a virtual plane and the line-of-sight vector of the line of sight E2 for the image. If the object gaze point P1 and the image gaze point P2 described above are obtained, the processor 33, first, detects the line of sight E1 for the object and the line of sight E2 for the image as the line-of-sight vectors based on the information obtained by the light reception unit 32. After that, for example, the intersection point between the line of sight E1 for the object and a predetermined virtual plane and the intersection point between the line of sight E2 for the image and a predetermined virtual plane are defined as the object gaze point P1 and the image gaze point P2, respectively. The processor 33 obtains the coordinates of the object gaze point P1 and the image gaze point P2 based on a coordinate of a reference position on the virtual plane. The virtual plane may be provided on the surface of, for example, the half mirror 22, or may be provided in a space between the left and right eyeballs of the user and the half mirror 22. The processor 33 causes the storage 45 to store the line-of-sight vectors of the line of sight E1 for the object and the line of sight E2 for the image, and the coordinates of the object gaze point P1 and the image gaze point P2. Furthermore, the processor 33 may store in advance, in the storage 45, the line-of-sight vector of the line of sight E1 for the object acquired when the user gazes at the object M and the coordinates of the object gaze point P1, and then, the processor 33 may directly output the line-of-sight vector of the line of sight E2 for the image acquired when the user gazes at the target image I and the coordinates of the image gaze point P2 to the difference detection unit 41.

For example, if the left-eye display unit 20L and the right-eye display unit 20R are equipped in a state in which these units deviate in the up-down direction, there may be a case in which the line of sight when the user gazes at the object M and the line of sight when the user gazes at the target image I deviate in the up-down direction. In this case, if the user attempts to gaze at the object M, the target image I is not formed. In contrast, if the user attempts to gaze at the target image I, the image of the object M is not formed. As a result, a burden is imposed on the eyes of the user. Accordingly, in the present embodiment, if a difference is present between the line of sight E1 for the object and the line of sight E2 for the image of the user in the up-down direction, the burden imposed on the user is reduced by adjusting a position of an image displayed on each of the left-eye display unit 20L and the right-eye display unit 20R so as to reduce the difference.

The difference detection unit 41 detects a difference between the line of sight E1 for the object and the line of sight E2 for the image in the up-down direction based on the information stored in the storage 45 or the information output from the processor 33. As illustrated in FIG. 7, the difference detection unit 41 is able to detect, as a difference S1, a distance between, for example, the object gaze point P1 and the image gaze point P2 in the up-down direction. Furthermore, if the difference detection unit 41 detects a difference between the line-of-sight vector of the line of sight E1 for the object and the line-of-sight vector of the line of sight E2 for the image, the difference detection unit 41 is able to detect, as a difference, a vector amount of the vector obtained as, for example, a line-of-sight vector in the up-down direction. The difference detection unit 41 outputs the detected difference S1.

The adjustment unit 42 adjusts, in accordance with the difference S1 that is output from the difference detection unit 41, the display position of the image in a case in which the image is displayed on each of the left-eye display unit 20L and the right-eye display unit 20R. For example, if the difference S1 is larger than or equal to a predetermined threshold, the adjustment unit 42 is able to adjust the display position. The adjustment unit 42 is able to adjust the display position by selecting, for example, a starting line of the image data stored in the line memory 43 to be read out by the address controller 44.

Figure 8:
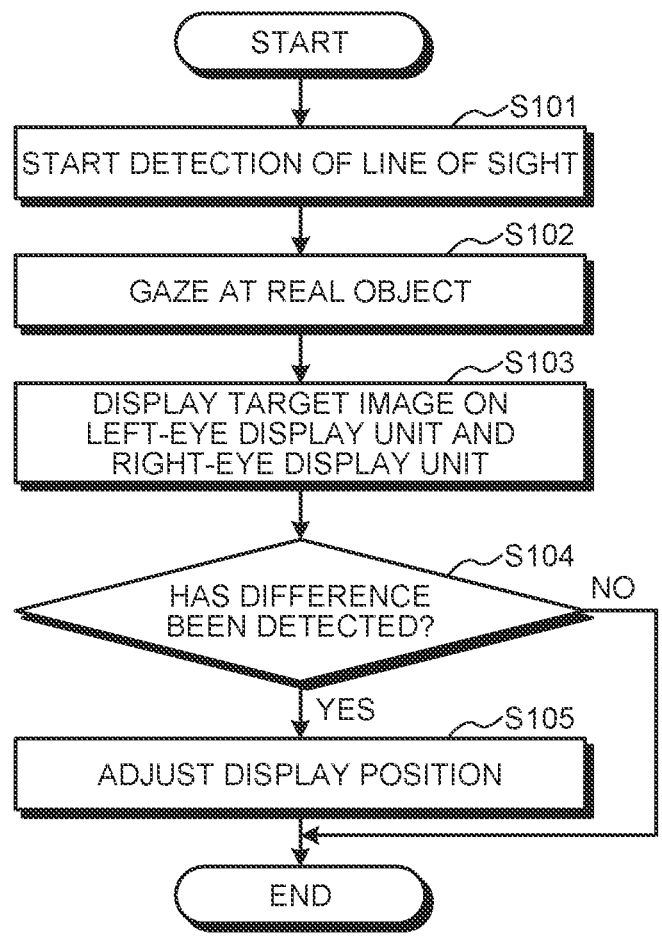
FIG. 8 is a flowchart illustrating an example of a display adjustment method according to the present embodiment.

FIG. 8 is a flowchart illustrating an example of a display adjustment method according to the present embodiment. After the display apparatus 100 is worn on a head of a user, as illustrated in FIG. 8, the line-of-sight detection unit 30 starts the detection of a line of sight of each of the left and right eyeballs of the user (Step S101), and allows the user to gaze at the object M in this state (Step S102). At Step S102, the line-of-sight detection unit 30 detects the line of sight E1 for the object of the user while allowing the user to gaze at the object M.

Then, the line-of-sight detection unit 30 displays the target image I at the position associated with the object M on each of the left-eye display unit 20L and the right-eye display unit 20R, and allows the user to gaze at the target image I (Step S103). At Step S103, the line-of-sight detection unit 30 detects the line of sight E2 for the image of the user while allowing the user to gaze at the target image I.

Then, the difference detection unit 41 detects a difference between the line of sight E1 for the object and the line of sight E2 for the image in the up-down direction (Step S104). If the difference is detected by the difference detection unit 41 (Yes at Step S104), the adjustment unit 42 adjusts the display position when the image is displayed on each of the left-eye display unit 20L and the right-eye display unit 20R (Step S105), and ends the processes. If the difference is not detected by the difference detection unit 41 (No at Step S104), the adjustment unit 42 ends the processes without adjusting the display position of the image.

As described above, the display apparatus 100 according to the present embodiment includes the left-eye display unit 20L and the right-eye display unit 20R that are arranged side by side in the left-right direction, that are configured to transmit a portion of light, and that are configured to display an image; the line-of-sight detection unit 30 that is able to detect the line of sight E1 for the object of each of the left and right eyeballs of the user in a case in which the user gazes at, through each of the left-eye display unit 20L and the right-eye display unit 20R, the object M that is located in front of the user in the front-back direction, and the line of sight E2 for the image of each of the left and right eyeballs of the user in a case in which the user gazes at the target image I displayed at a position associated with the object M on each of the left-eye display unit 20L and the right-eye display unit 20R; and the adjustment unit 42 configured to adjust a display position at which the image is displayed on each of the left-eye display unit 20L and the right-eye display unit 20R in accordance with the difference between the line of sight E1 for the object and the line of sight E2 for the image in the up-down direction that is orthogonal to each of the left-right direction and the front-back direction.

The display adjustment method according to the present embodiment includes: detecting the line of sight E1 for the object of each of the left and right eyeballs of the user in a case in which the user gazes at the object M that is located in front of the user in the front-back direction through the left-eye display unit 20L and the right-eye display unit 20R that are arranged side by side in the left-right direction, that are configured to transmit a portion of light, and that are configured to display the image, and the line of sight E2 for the image of the left and right eyeballs of the user in a case in which the user gazes at the target image I displayed at a position associated with the object M on each of the left-eye display unit 20L and the right-eye display unit 20R; and adjusting the display position in a case in which the image is displayed on each of the left-eye display unit 20L and the right-eye display unit 20R in accordance with the difference between the line of sight E1 for the object and the line of sight E2 for the image in the up-down direction that are orthogonal to each of the left-right direction and the front-back direction.

According to the present embodiment, when the difference in the up-down direction is present between the line of sight E1 for the object and the line of sight E2 for the image of the user, the position of the image displayed on each of the left-eye display unit 20L and the right-eye display unit 20R is adjusted such that the difference is decreased. As a result, when the image associated with the object M is displayed, it is possible to allow the user to gaze at the image with the same line of sight for gazing at the object M. As a result, it is possible to reduce a burden imposed on the user.

In the display apparatus 100 according to the present embodiment, the adjustment unit 42 adjusts the display position in a stepwise manner in accordance with the difference in the up-down direction. With this configuration, it is possible to adjust the display position in a stepwise manner in accordance with the difference, and it is thus possible to perform an efficient adjustment.

In the display apparatus 100 according to the present embodiment, the adjustment unit 42 adjusts the display position in accordance with the difference in the up-down direction between the position of the object gaze point P1 associated with the line of sight E1 for the object and the position of the image gaze point P2 associated with the line of sight E2 for the image. With this configuration, it is possible to adjust the display position with higher accuracy by calculating the difference based on the object gaze point P1 and the image gaze point P2.

In the display apparatus 100 according to the present embodiment, the adjustment unit 42 includes the line memory 43 to which the image data of the image is written, and adjusts the display position by selecting a starting line of the image data stored in the line memory 43 to be read out according to the difference. With this configuration, by selecting the starting line of the image data stored in the line memory 43 to be read out, it is possible to easily adjust the display position without changing the positional relationship among the components constituting the display unit 20.

Another Display Adjustment Method

In the following, another example of the display adjustment method will be described. In a state in which the user wears the display apparatus 100 described above on a head, the left-eye display unit 20L is placed in front of the left eye of the user and the right-eye display unit 20R is placed in front of the right eye of the user. In a display adjustment method according to the other example, the target image I is displayed in front of the user on each of the left-eye display unit 20L and the right-eye display unit 20R, and adjustment is performed such that a difference between the left line of sight E2L for the image of the left eyeball of the user when the user gazes at the target image I and the right line of sight E2R for the image of the right eyeball of the user when the user gazes at the target image I is reduced.

First, the detection of the line of sight of each of the left eye and the right eye of the user is started by the line-of-sight detection unit 30. In this state, the user is allowed to gaze at the target image I. In this case, the display unit 20 displays the target image I at a position in each of the left-eye display unit 20L and the right-eye display unit 20R. An example of the position in this case includes, for example, symmetrical positions in the left-eye display unit 20L and the right-eye display unit 20R. The display unit 20 may display information or the like for urging the user to gaze at the target image I. The line-of-sight detection unit 30 detects, in a state in which the user is allowed to gaze at the target image I, the left line of sight E2L for the image of the left eyeball of the user and the right line of sight E2R for the image of the right eyeball.

Figure 9:
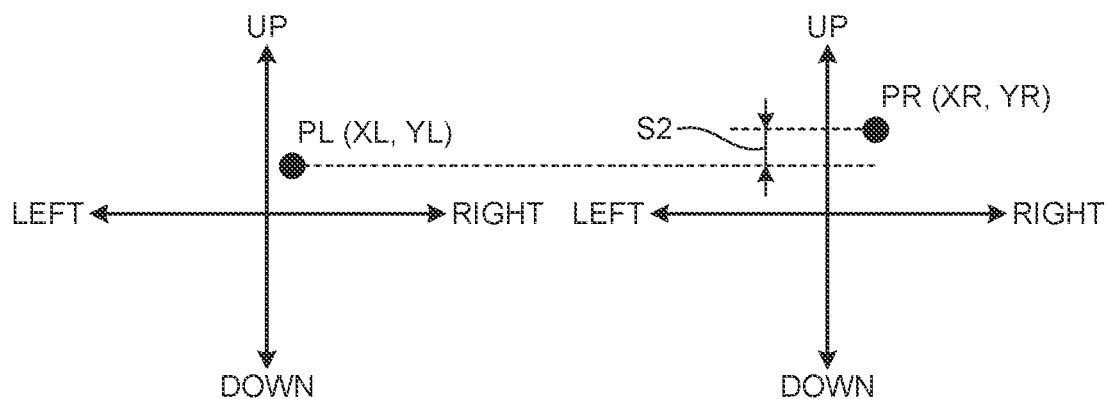
FIG. 9 is a diagram schematically illustrating an example of detection results of a left line of sight for an image and a right line of sight for an image.

FIG. 9 is a diagram schematically illustrating an example of the detection results of the left line of sight E2L for the image and the right line of sight E2R for the image. In the example illustrated in FIG. 9, the line-of-sight detection unit 30 is able to detect the position (XL, YL) of the left image gaze point PL of the user associated with the left line of sight E2L for the image, and the position (XR, YR) of the right image gaze point PR of the user associated with the right line of sight E2R for the image as the left line of sight E2L for the image and the right image line of sight E2R for the image.

In the present embodiment, the left image gaze point PL is an intersection point between a virtual plane that is perpendicular to the front-back direction and that is away from the left and right eyeballs of the subject by a predetermined distance and the line-of-sight vector of the left line of sight E2L for the image. Furthermore, the right image gaze point PR is an intersection point between the virtual plane and the line-of-sight vector of the right line of sight E2R for the image. If the left image gaze point PL and the right image gaze point PR described above are obtained, the processor 33 detects, first, the left line of sight E2L for the image and the right line of sight E2R for the image as the line-of-sight vectors based on the information obtained by the light reception unit 32. Then, for example, the intersection point between the predetermined virtual plane and the left line of sight E2L for the image and the intersection point between the predetermined virtual plane and the right line of sight E2R for the image are defined as the left image gaze point PL and the right image gaze point PR, respectively. The processor 33 obtains the coordinates of each of the left image gaze point PL and the right image gaze point PR based on the coordinate of the reference position on the virtual plane as a reference point. The processor 33 causes the storage 45 to store therein the line-of-sight vector of each of the left line of sight E2L for the image and the right line of sight E2R for the image and the coordinates of each of the left image gaze point PL and the right image gaze point PR. Furthermore, the processor 33 may directly output, to the difference detection unit 41, the line-of-sight vector of each of the left line of sight E2L for the image and the right line of sight E2R for the image and the coordinates of each of the left image gaze point PL and the right image gaze point PR that are acquired when the user gazes at the target image I. Furthermore, the storage 45 stores therein a display adjustment program for causing a computer to perform a process of displaying the target image I located in front of the user on each of the left-eye display unit 20L and the right-eye display unit 20R that are arranged side by side in the left-right direction and that are able to display an image; a process of detecting the left line of sight E2L for the image of the left eyeball of the user and the right line of sight E2R for the image of the right eyeball when the user gazes at the target image I; and a process of adjusting the display position when the image is displayed on each of the left-eye display unit 20L and the right-eye display unit 20R in accordance with the difference between the left line of sight E2L for the image and the right line of sight E2R for the image in the up-down direction that is orthogonal to each of the left-right direction and the front-back direction.

For example, similarly to the embodiment described above, if the left-eye display unit 20L and the right-eye display unit 20R are equipped in a state in which these units deviate in the up-down direction, there may be a case in which a line of sight when the left-eye display unit 20L is viewed by the left eye and a line of sight when the right-eye display unit 20R is viewed by the right eye deviate in the up-down direction. In this case, an image is not formed at the moment of viewing the target image, but is formed by moving the left and right eyeballs in the up-down direction based on a command from the brain. However, in this case, a burden is accordingly imposed on the eyes of the user. Thus, in the present embodiment, if the difference in the up-down direction is present between the left line of sight E2L for the image and the right line of sight E2R for the image of the user, a burden imposed on the user is to be reduced by adjusting a position of the image displayed on each of the left-eye display unit 20L and the right-eye display unit 20R so as to reduce the difference.

The difference detection unit 41 detects the difference between the left line of sight E2L for the image and the right line of sight E2R for the image in the up-down direction based on the information stored in the storage 45 or the information output from the processor 33. As illustrated in FIG. 9, the difference detection unit 41 is able to detect, as a difference S2, a distance between, for example, the left image gaze point PL and the right image gaze point PR in the up-down direction. Furthermore, if the difference detection unit 41 detects a difference between the line-of-sight vector of the left line of sight E2L for the image and the line-of-sight vector of the right line of sight E2R for the image, the difference detection unit 41 is able to detect a length of a vector in the up-down direction that is obtained as a difference between, for example, the line-of-sight vectors. The difference detection unit 41 outputs the detected difference S2.

The adjustment unit 42 adjusts a display position when the image is displayed on each of the left-eye display unit 20L and the right-eye display unit 20R in accordance with the difference S2 output from the difference detection unit 41. For example, if the difference S2 is greater than or equal to a predetermined threshold, the adjustment unit 42 is able to adjust the display position of the image. In this case, the adjustment unit 42 is able to adjust the display position of the image in the up-down direction to a position located at a midpoint between the left image gaze point PL and the right image gaze point PR. As a result, it is possible to distribute an amount of the adjustment of the display position to both of the left-eye display unit 20L and the right-eye display unit 20R. The adjustment unit 42 is able to adjust the display position of the image by selecting, for example, a starting line of the image data stored in the line memory 43 to be read out by the address controller 44. Furthermore, the adjustment unit 42 may adjust the display position of the image such that one of the left-eye display unit 20L and the right-eye display unit 20R is aligned with the other one of the left-eye display unit 20L and the right-eye display unit 20R.

Figure 10:
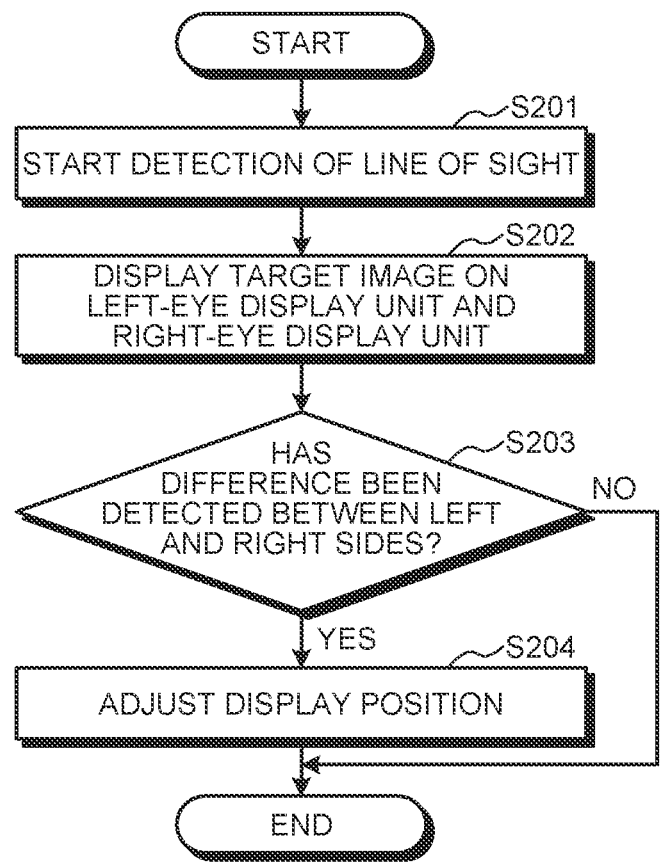
FIG. 10 is a flowchart illustrating another example of the display adjustment method.

FIG. 10 is a flowchart illustrating another example of the display adjustment method. After the display apparatus 100 is worn on the head of the user, as illustrated in FIG. 10, the line-of-sight detection unit 30 starts the detection of a line of sight of each of the left and right eyeballs of the user (Step S201), displays the target image I on each of the left-eye display unit 20L and the right-eye display unit 20R in this state, and allows the user to gaze at the target image I (Step S202). At Step S202, the line-of-sight detection unit 30 detects the left line of sight E2L for the image and the right line of sight E2R for the image of the user while allowing the user to gaze at the target image I.

Then, the difference detection unit 41 detects the difference between the left line of sight E2L for the image and the right line of sight E2R for the image in the up-down direction (Step S203). If the difference is detected by the difference detection unit 41 (Yes at Step S203), the adjustment unit 42 adjusts the display position of the image when the image is displayed on each of the left-eye display unit 20L and the right-eye display unit 20R (Step S204), and ends the processes. If the difference is not detected in the difference detection unit 41 (No at Step S203), the adjustment unit 42 ends the processes without adjusting the display position of the image.

The display apparatus 100 according to the present embodiment includes: the left-eye display unit 20L and the right-eye display unit 20R that are arranged side by side in the left-right direction and configured to display the image; the line-of-sight detection unit 30 configured to detect the line of sight for the image comprising the left line of sight E2L for the image of the left eyeball of the user and the right line of sight E2R for the image of the right eyeball of the user in a state in which the user gazes at the target image I displayed on each of the left-eye display unit 20L and the right-eye display unit 20R provided in front of the user in the front-back direction thereof; and the adjustment unit 42 configured to adjust, based on the left line of sight E2L for the image and the right line of sight E2R for the image, the display position at which the image is displayed on each of the left-eye display unit 20L and the right-eye display unit 20R, wherein the adjustment unit 42 is further configured to adjust the display position in accordance with the first difference in the up-down direction between the left line of sight E2L for the image and the right line of sight E2R for the image.

The display system according to the present embodiment includes: the display apparatus 100 that includes the left-eye display unit 20L and the right-eye display unit 20R that are arranged side by side in the left-right direction and configured to display the image, the line-of-sight detection unit 30 configured to detect the left line of sight E2L for the image of the left eyeball of the user and the right line of sight E2R for the image of the right eyeball of the user in a state in which the user gazes at the target image I displayed on each of the left-eye display unit 20L and the right-eye display unit 20R provided in front of the user in the front-back direction thereof; and the output unit 41 configured to output the left line of sight E2L for the image and the right line of sight E2R for the image; and the external processing device 350 configured to generate, based on an output result received from the output unit 41, image data in which the display position of the image to be displayed on each of the left-eye display unit 20L and the right-eye display unit 20R has been adjusted and to input the generated image data to the display apparatus 100, wherein the external processing device 350 is further configured to adjust the display position in accordance with the first difference in the up-down direction between the left line of sight E2L for the image and the right line of sight E2R for the image.

The display adjustment method according to the present embodiment includes: displaying the target image I on each of the left-eye display unit 20L and the right-eye display unit 20R that are arranged side by side in the left-right direction in front of the user in the front-back direction thereof to display the image; detecting the left line of sight E2L for the image of the left eyeball of the user and the right line of sight E2R for the image of the right eyeball of the user in a state in which the user gazes at the target image I displayed on each of the left-eye display unit 20L and the right-eye display unit 20R; and adjusting the display position at which the image is displayed on each of the left-eye display unit 20L and the right-eye display unit 20R based on the left line of sight E2L for the image and the right line of sight E2R for the image, wherein the display position is adjusted in accordance with the first difference in the up-down direction between the left line of sight E2L for the image and the right line of sight E2R for the image.

According to the present embodiment, if the difference in the up-down direction is present between the left line of sight E2L for the image and the right line of sight E2R for the image of the user, the position of the image displayed on each of the left-eye display unit 20L and the right-eye display unit 20R is adjusted so as to reduce the difference. As a result, when the image is displayed on each of the left-eye display unit 20L and the right-eye display unit 20R, it is possible to allow the user to gaze at the image with the same line of sight for each of the left and right eyes. Accordingly, it is possible to reduce a burden imposed on the user.

In the display apparatus 100 according to the present embodiment, the adjustment unit 42 adjusts the display position in accordance with the difference in the up-down direction between the position of the left image gaze point PL associated with the left line of sight E2L for the image and the position of the right image gaze point PR associated with the right line of sight E2R for the image. According to this configuration, it is possible to adjust the display position with higher accuracy by calculating the difference based on the left image gaze point PL and the right image gaze point PR.

In the display apparatus 100 according to the present embodiment, the adjustment unit 42 adjusts the display position to a position located at a midpoint between the left image gaze point PL and the right image gaze point PR in the up-down direction. According to this configuration, it is possible to distribute an amount of the adjustment of the display position to each of the left-eye display unit 20L and the right-eye display unit 20R. As a result, it is possible to prevent a state in which a part of a display image is protruded outside the display area of each of the left-eye display unit 20L and the right-eye display unit 20R to be hidden.

The technical scope of the present application is not limited to the embodiments described above and various modifications are possible as long as they do not depart from the spirit of the present application. For example, in the display apparatus 100 according to the embodiment described above, a case has been described as one example in which the adjustment unit 42 adjusts the display position by selecting a starting line of the image data stored in the line memory 43 to be read out; however, the embodiment is not limited to this.

Figure 11:
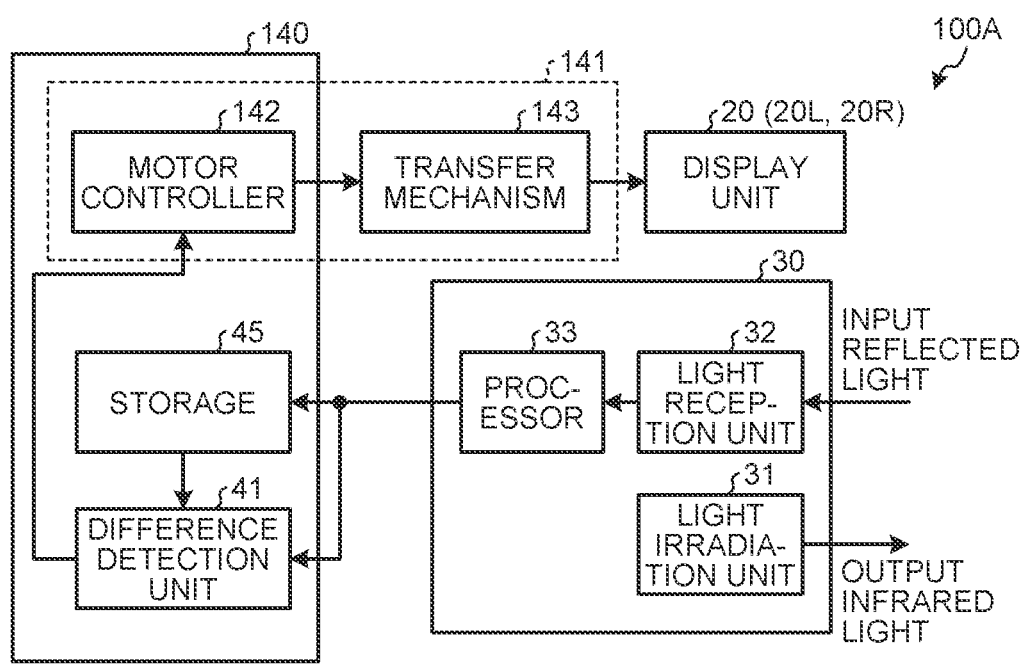
FIG. 11 is a functional block diagram illustrating another example of the display apparatus.

FIG. 11 is a functional block diagram illustrating another example of the display apparatus. As illustrated in FIG. 11, a display apparatus 100A includes the line-of-sight detection unit 30 and a controller 140. The display apparatus 100A illustrated in FIG. 11 allows the position of the display image to move in the up-down direction by moving the display panel 21 included in the display unit 20. The configuration of the line-of-sight detection unit 30 is the same as that described above.

The controller 140 includes the difference detection unit 41, a motor controller 142, and the storage 45. The configuration of the difference detection unit 41 and the storage 45 are the same as those described above. The motor controller 142 controls a transfer mechanism 143M. The motor controller 142 and the transfer mechanism 143 constitute an adjustment unit 141 that allows the display panel 21 to move.

Figure 12:
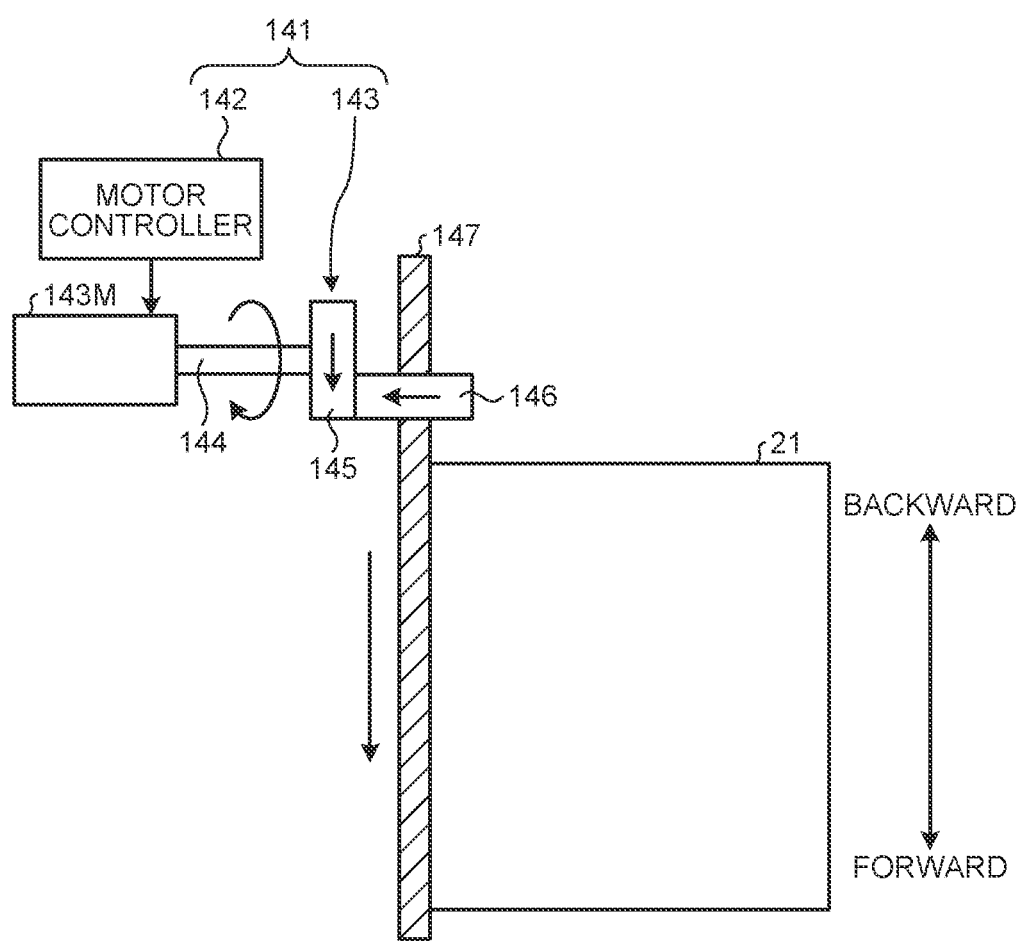
FIG. 12 is a diagram illustrating an example of a transfer mechanism.

FIG. 12 is a diagram illustrating an example of the transfer mechanism 143. The transfer mechanism 143 includes the motor 143M, an output shaft 144, a first gear 145, a second gear 146, and a transfer member 147. The motor 143M applies a rotational driving force to the output shaft 144 by the control of the motor controller 142. The output shaft 144 transmits the rotational driving force received from the motor 143M to the first gear 145. The first gear 145 rotates in an integral manner with the output shaft 144. The first gear 145 is engaged with the second gear 146. The second gear 146 includes teeth around the outer circumference and the inner circumference thereof. The teeth around the outer circumference are engaged with the first gear 145. The teeth around the inner circumference are engaged with the transfer member 147. The transfer member 147 has a columnar shape and has teeth that are formed around the outer circumference thereof. The teeth around the outer circumference of the transfer member 147 are engaged with the second gear 146. The transfer member 147 is capable of moving in the front-back direction caused by rotation of the second gear 146. The transfer member 147 is coupled to the display panel 21. The display panel 21 moves in the front-back direction in a integral manner with the transfer member 147 due to a movement of the transfer member 147 in the front-back direction, so that the display position of the image displayed on the display panel 21 moves in the front-back direction. The image displayed on the display panel 21 is reflected by the half mirror 22 and the combiner mirror 23 and reaches the user. In this case, in the state in which the user wears the display apparatus 100, the display position of the image to be displayed moves in the up-down direction due to a movement of the display panel 21 in the front-back direction. The motor controller 142 is capable of adjusting an amount of the movement of the display panel 21 in a stepwise manner by adjusting an amount of rotation of the motor 143M in a stepwise manner in accordance with the difference in the up-down direction. As a result, it is possible to adjust the display position in a stepwise manner in accordance with the difference in the up-down direction.

Figure 13:
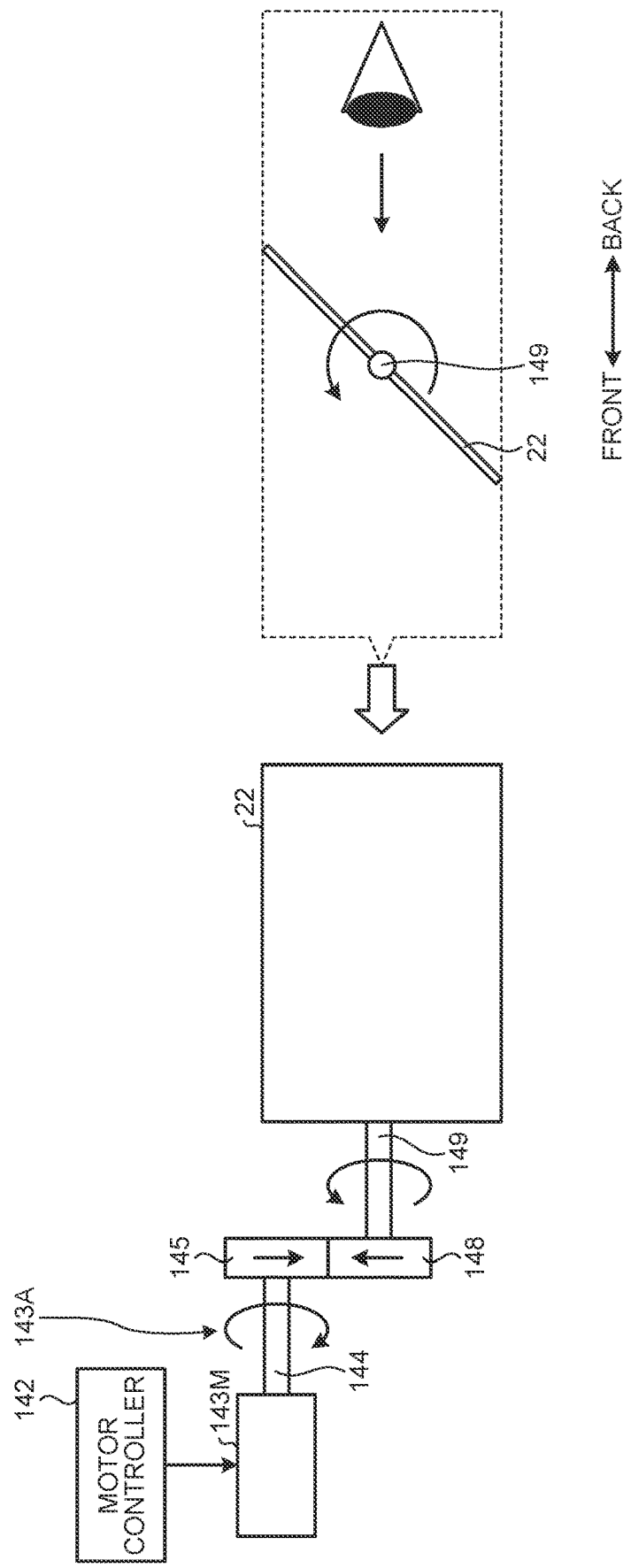
FIG. 13 is a diagram illustrating another example of a motor mechanism.

FIG. 13 is a diagram illustrating another example of a motor mechanism. As illustrated in FIG. 13, a transfer mechanism 143A includes the motor 143M, the output shaft 144, the first gear 145, a second gear 148, and a rotation shaft 149. The configurations of the motor 143M, the output shaft 144, and the first gear 145 may be the same as those of the example illustrated in FIG. 12. The second gear 148 includes teeth around the outer circumference thereof and is engaged with the first gear 145. The rotation shaft 149 rotates in an integral manner with the second gear 148. The rotation shaft 149 is coupled to the half mirror 22. Furthermore, FIG. 13 illustrates a part of a state of the half mirror 22 viewed from the direction indicated by white arrow. The half mirror 22 is rotated integrally with the rotation shaft 149 caused by a rotation of the rotation shaft 149. The direction of light toward the eyeballs of the user is changed in the up-down direction due to the rotation of the half mirror 22. As a result, it is possible to move the position of the display image to be displayed on each of the left-eye display unit 20L and the right-eye display unit 20R in the up-down direction. In this case, also, the motor controller 142 is capable of adjusting an angle of the rotation of the half mirror 22 in a stepwise manner by adjusting an amount of the rotation of the motor 143M in a stepwise manner in accordance with the difference in the up-down direction in a stepwise manner. As a result, it is possible to adjust the display position in a stepwise manner in accordance with the difference in the up-down direction in a stepwise manner.

In this say, in the display apparatus 100A described above, the adjustment unit 141 adjusts the display position by adjusting a relative positional relationship in the up-down direction related to each of the left-eye display unit 20L and the right-eye display unit 20R. As a result, an area used to display an image is not limited by directly adjust the relative positional relationship in the up-down direction of each of the left-eye display unit 20L and the right-eye display unit 20R.

Furthermore, with the configuration in which the adjustment unit 141 adjusts the display position by adjusting the relative positional relationship in the up-down direction of each of the left-eye display unit 20L and the right-eye display unit 20R, it is possible to directly adjust the difference in the up-down direction. Furthermore, with the configuration in which the adjustment unit 141 adjusts the display position by adjusting the half mirror 22, it is possible to adjust the display position without changing the position of each of the left-eye display unit 20L and the right-eye display unit 20R.

Furthermore, the transfer mechanism 143 illustrated in FIG. 12 and FIG. 13 may also be a configuration in which the motor 143M is not provided and the output shaft 144 is rotated by manually. In this case, for example, the difference between the line of sight E1 for the object and the line of sight E2 for the image or the difference between the left line of sight E2L for the image and the right line of sight E2R for the image may be displayed on the display unit 20. As a result, this makes it possible for the user to easily grasp an amount of the adjustment when the user manually adjusts the position of the display image in the up-down direction.

Figure 14:
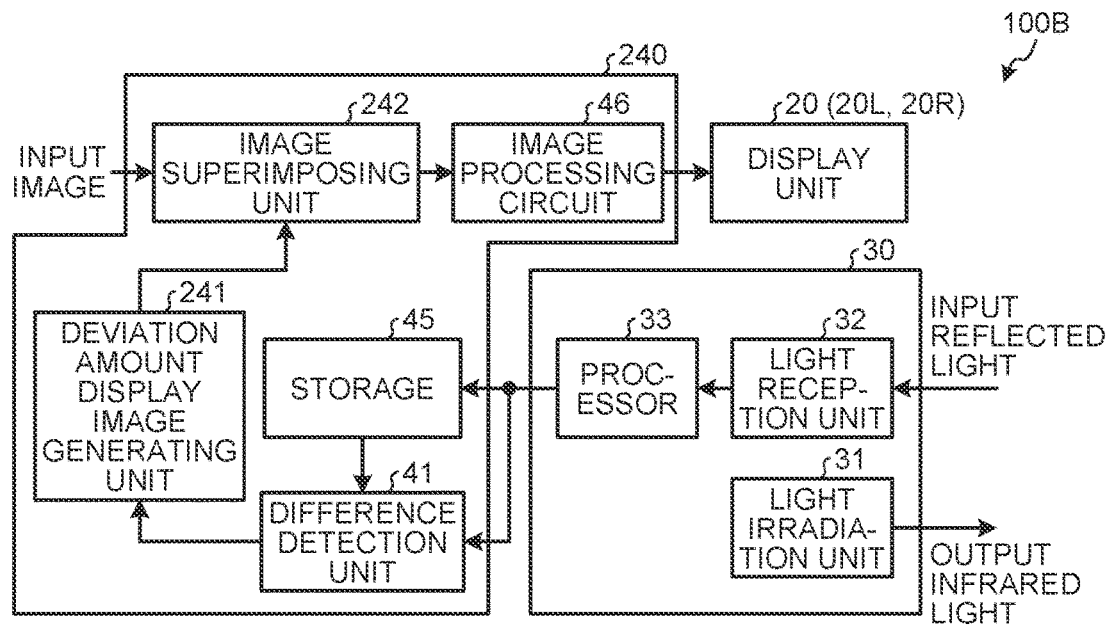
FIG. 14 is a functional block diagram illustrating another example of the display apparatus.

FIG. 14 is a functional block diagram illustrating another example of the display apparatus and illustrates a configuration in which the output shaft 144 is manually rotated. As illustrated in FIG. 14, a display apparatus 100B includes the line-of-sight detection unit 30 and a controller 240. The configuration of the line-of-sight detection unit 30 is the same as that described above. The controller 240 includes the difference detection unit 41, a deviation amount display image generating unit 241, an image superimposing unit 242, the storage 45, and the image processing circuit 46. The configurations of the difference detection unit 41, the storage 45, and the image processing circuit 46 are the same as those described above. The deviation amount display image generating unit 241 generates a deviation amount display image that is to be displayed on the display unit 20 and that indicates the difference between the line of sight E1 for the object and the line of sight E2 for the image or the difference between the left line of sight E2L for the image and the right line of sight E2R for the image as a deviation amount. An arbitrary image may be used as the deviation amount display image. The deviation amount display image generating unit 241 is able to change the deviation amount display image in accordance with the detection result of the difference detection unit 41. For example, if the line of sight E2 for the image deviates downward with respect to the line of sight E1 for the object, the deviation amount display image is able to be displayed in a blue color; if the line of sight E2 for the image deviates upward with respect to the line of sight E1 for the object, the deviation amount display image is able to be displayed in a red color; and if the deviation is not present, the deviation amount display image is able to be displayed without a color. Furthermore, the deviation amount display image generating unit 241 is able to display the deviation amount display image in a darker color of the same color as the deviation amount is increased. The image superimposing unit 242 displays the target image I so as to be superimposed on the deviation amount display image. With this configuration, by allowing the user to adjust the color of the deviation amount display image so as to be a lighter color of the same color and colorless, it is possible to easily adjust the difference between the line of sight E1 for the object and the line of sight E2 for the image.

Display System

Figure 15:
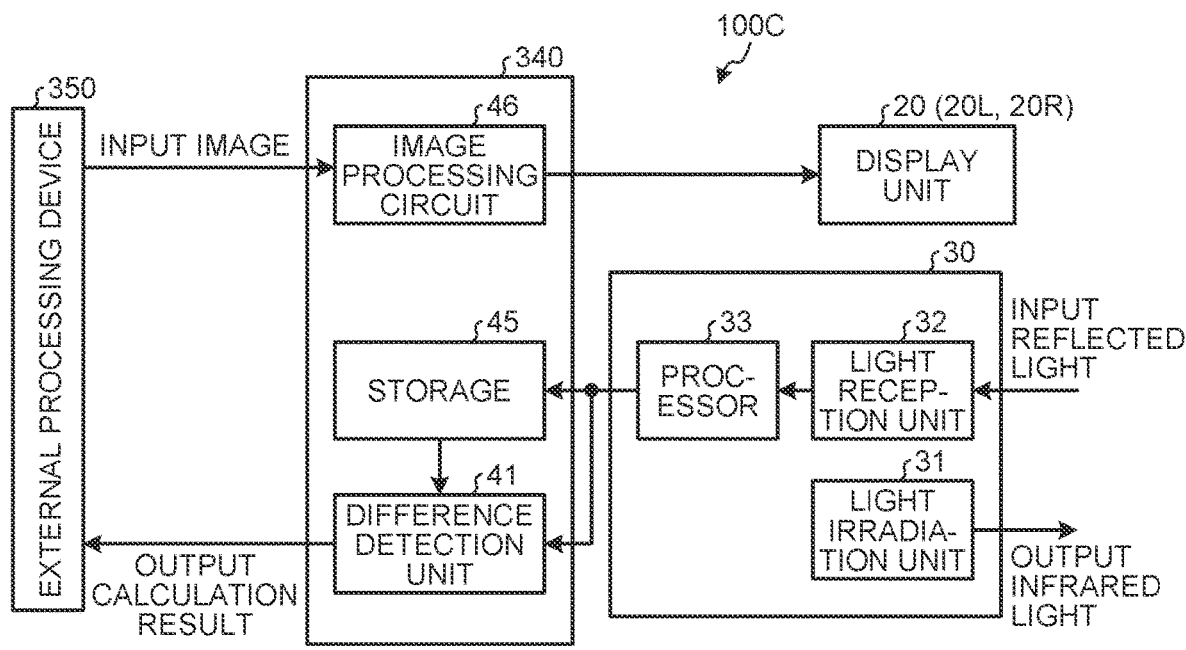
FIG. 15 is a functional block diagram illustrating an example of a display system that includes the display apparatus.

FIG. 15 is a functional block diagram illustrating an example of a display system that includes a display apparatus. As illustrated in FIG. 15, a display system SYS includes a display apparatus 100C, and an external processing device 350. The display apparatus 100C includes the display unit 20, the line-of-sight detection unit 30, and a controller 340. The configurations of the display unit 20 and the line-of-sight detection unit 30 are the same as those described above.

The controller 340 includes the difference detection unit 41, the storage 45, and the image processing circuit 46. The configuration of each of the components in the difference detection unit 41, the storage 45, and the image processing circuit 46 are the same as those described above. In the configuration illustrated in FIG. 15, the difference detection unit 41 has a function as an output unit that outputs a result of detecting a difference to the external processing device 350.

The external processing device 350 generates image data in which the display position of the image displayed on each of the left-eye display unit 20L and the right-eye display unit 20R has been adjusted based on an output result of the difference detection unit 41. The external processing device 350 inputs the generated image data to the display apparatus 100C. The image data is input to, for example, the image processing circuit 46. The image processing circuit 46 outputs the input image data to the display unit 20 (20L and 20R).

In this way, the display system SYS according to the present embodiment outputs the difference between the line of sight E1 for the object and the line of sight E2 for the image in the up-down direction from the display apparatus 100C, and, based on the output result, the external processing device 350 generates the image data in which the display position of the image displayed on each of the left-eye display unit 20L and the right-eye display unit 20R has been adjusted, and inputs the generated image data to the display apparatus 100C, so that it is possible to adjust the display position of the image without generating a missing part of the image.

Furthermore, the display system SYS described above outputs the difference between the left line of sight E2L for the image and the right line of sight E2R for the image in the up-down direction from the display apparatus 100C, and, based on the output result, the external processing device 350 generates image data in which the display position of the image displayed on each of the left-eye display unit 20L and the right-eye display unit 20R has been adjusted, and inputs the generated image data to the display apparatus 100C, so that it is possible to adjust the display position of the image without generating a missing part of the image.

Furthermore, in the description above, in a method of adjusting the display position of the image displayed on each of the left-eye display unit 20L and the right-eye display unit 20R in accordance with the difference between the left line of sight E2L for the image and the right line of sight E2R for the image in the up-down direction, the display apparatus is not limited to a display apparatus (what is called an augmented reality (AR) type) in which the real image light La of the real object M is able to pass through the display unit 20. For example, a display apparatus (what is called a virtual reality (VR) type) that allows the user to view the image displayed on the display unit 20 through which the real image light La does not pass may be used.

As described above, the display apparatus 100 according to the present embodiment includes: the left-eye display unit 20L and the right-eye display unit 20R that are arranged side by side in the left-right direction and configured to display the image; the line-of-sight detection unit 30 configured to detect the line of sight for the image comprising the left line of sight E2L for the image of the left eyeball of the user and the right line of sight E2R for the image of the right eyeball of the user in a state in which the user gazes at the target image I displayed on each of the left-eye display unit 20L and the right-eye display unit 20R provided in front of the user in the front-back direction thereof; and the adjustment unit 42 configured to adjust, based on the left line of sight E2L for the image and the right line of sight E2R for the image, the display position at which the image is displayed on each of the left-eye display unit 20L and the right-eye display unit 20R, wherein the adjustment unit is further configured to adjust the display position in accordance with the first difference in the up-down direction between the left line of sight E2L for the image and the right line of sight E2R for the image.

The display system SYS according to the embodiment described above includes: the display apparatus 100 that includes the left-eye display unit 20L and the right-eye display unit 20R that are arranged side by side in the left-right direction and configured to display the image, the line-of-sight detection unit 30 configured to detect the left line of sight E2L for the image of the left eyeball of the user and the right line of sight E2R for the image of the right eyeball of the user in a state in which the user gazes at the target image I displayed on each of the left-eye display unit 20L and the right-eye display unit 20R provided in front of the user in the front-back direction thereof; and the output unit 41 configured to output the left line of sight E2L for the image and the right line of sight E2R for the image; and the external processing device 350 configured to generate, based on the output result received from the output unit 41, the image data in which the display position of the image to be displayed on each of the left-eye display unit 20L and the right-eye display unit 20R has been adjusted and to input the generated image data to the display apparatus 100, wherein the external processing device 350 is further configured to adjust the display position in accordance with the first difference in the up-down direction between the left line of sight E2L for the image and the right line of sight E2R for the image.

The display adjustment method according to the embodiment described above includes: displaying the target image I on each of the left-eye display unit 20L and the right-eye display unit 20R that are arranged side by side in the left-right direction in front of the user in the front-back direction thereof to display the image; detecting the left line of sight E2L for the image of the left eyeball of the user and the right line of sight E2R for the image of the right eyeball of the user in a state in which the user gazes at the target image I displayed on each of the left-eye display unit 20L and the right-eye display unit 20R; and adjusting the display position at which the image is displayed on each of the left-eye display unit 20L and the right-eye display unit 20R based on the left line of sight E2L for the image and the right line of sight E2R for the image, wherein the display position is adjusted in accordance with the first difference in the up-down direction between the left line of sight E2L for the image and the right line of sight E2R for the image.

According to the present application, it is possible to reduce a burden imposed on a user.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display apparatus comprising:
a left-eye display unit and a right-eye display unit that are arranged side by side in a left-right direction and configured to display an image;
a line-of-sight detection unit configured to detect a line of sight for an image comprising a left line of sight for an image of a left eyeball of a user and a right line of sight for an image of a right eyeball of the user in a state in which the user gazes at a target image displayed on each of the left-eye display unit and the right-eye display unit provided in front of the user in a front-back direction thereof; and
an adjustment unit configured to adjust, based on the left line of sight for the image and the right line of sight for the image, a display position at which an image is displayed on each of the left-eye display unit and the right-eye display unit, wherein
the adjustment unit is further configured to adjust the display position in accordance with a first difference in an up-down direction between the left line of sight for the image and the right line of sight for the image.

2. The display apparatus according to claim 1, wherein the first difference is a difference in the up-down direction between a position of a left image gaze point corresponding to the left line of sight for the image and a position of a right image gaze point corresponding to the right line of sight for the image.

3. The display apparatus according to claim 1, wherein
the left-eye display unit and the right-eye display unit are
further configured to transmit a portion of light therethrough and to display the image,
the line-of-sight detection unit are further configured to detect;
a line of sight for an object comprising a left line of sight for an object of the left eyeball of the user and a right line of sight for an object of the right eyeball of the user in a case in which the user gazes at, through the left-eye display unit and the right-eye display unit, an object that is located in front of the user in the front-back direction; and
the line of sight for the image comprising the left line of sight for the image and the right line of sight for the image, and
the adjustment unit is further configured to adjust the display position in accordance with the first difference between the left line of sight for the image and the right line of sight for the image or a second difference between the line of sight for the object and the line of sight for the image.

4. The display apparatus according to claim 3, wherein the second difference is a difference in the up-down direction between a position of a gaze point of the user corresponding to the line of sight for the object and a position of a gaze point of the user corresponding to the line of sight for the image.

5. The display apparatus according to claim 1, wherein the adjustment unit is further configured to adjust the display position in the up-down direction to a position located at a midpoint between the left line of sight for the image and the right line of sight for the image.

6. The display apparatus according to claim 3, wherein the adjustment unit is further configured to adjust the display position in a stepwise manner in accordance with the first difference in the up-down direction or the second difference in the up-down direction.

7. The display apparatus according to claim 1, wherein the adjustment unit is further configured to adjust the display position by adjusting a relative positional relationship between the left-eye display unit and the right-eye display unit in the up-down direction.

8. The display apparatus according to claim 3, wherein the adjustment unit includes a line memory in which image data of the image is written, and is further configured to adjust the display position in accordance with the first difference or the second difference by selecting a starting line to be read out of the image data stored in the line memory.

9. The display apparatus according to claim 3, wherein
each of the left-eye display unit and the right-eye display unit includes an optical system that guides light including the image, and
the adjustment unit is further configured to adjust the display position in accordance with the first difference or the second difference by adjusting the optical system.

10. A display system comprising:
a display apparatus that includes
a left-eye display unit and a right-eye display unit that are arranged side by side in a left-right direction and configured to display an image,
a line-of-sight detection unit configured to detect a left line of sight for an image of a left eyeball of a user and a right line of sight for an image of a right eyeball of the user in a state in which the user gazes at a target image displayed on each of the left-eye display unit and the right-eye display unit provided in front of the user in a front-back direction thereof; and
an output unit configured to output the left line of sight for the image and the right line of sight for the image; and
an external processing device configured to generate, based on an output result received from the output unit, image data in which a display position of an image to be displayed on each of the left-eye display unit and the right-eye display unit has been adjusted and to input the generated image data to the display apparatus, wherein
the external processing device is further configured to adjust the display position in accordance with the first difference in the up-down direction between the left line of sight for the image and the right line of sight for the image.

11. A display adjustment method comprising:
displaying a target image on each of a left-eye display unit and a right-eye display unit that are arranged side by side in a left-right direction in front of a user in the front-back direction thereof to display an image;
detecting a left line of sight for an image of a left eyeball of a user and a right line of sight for an image of a right eyeball of the user in a state in which the user gazes at the target image displayed on each of the left-eye display unit and the right-eye display unit; and
adjusting a display position at which an image is displayed on each of the left-eye display unit and the right-eye display unit based on the left line of sight for the image and the right line of sight for the image, wherein
the display position is adjusted in accordance with a first difference in an up-down direction between the left line of sight for the image and the right line of sight for the image.

* * * * *